United States Patent
Forsyth et al.

(10) Patent No.: US 8,029,838 B2
(45) Date of Patent: *Oct. 4, 2011

(54) METHOD FOR STORING BANANAS DURING RIPENING

(75) Inventors: Kevin Forsyth, Pembroke Pines, FL (US); Raul U. Fernandez, Weston, FL (US); Gonzalo Marquez, Miami, FL (US)

(73) Assignee: Chiquita Brands, Inc., Cincinnati, OH (US)

( * ) Notice: Subject to any disclaimer, the term of this patent is extended or adjusted under 35 U.S.C. 154(b) by 64 days.

This patent is subject to a terminal disclaimer.

(21) Appl. No.: 11/758,793

(22) Filed: Jun. 6, 2007

(65) Prior Publication Data

US 2008/0008793 A1    Jan. 10, 2008

Related U.S. Application Data

(60) Provisional application No. 60/805,931, filed on Jun. 27, 2006.

(51) Int. Cl.
*B65D 81/20* (2006.01)
(52) U.S. Cl. ......... 426/118; 426/112; 426/263; 426/316
(58) Field of Classification Search .................. 426/106, 426/112, 118, 316, 392, 263; 206/524.2
See application file for complete search history.

(56) References Cited

U.S. PATENT DOCUMENTS

| | | | |
|---|---|---|---|
| 5,556,658 A | 9/1996 | Raudalus et al. | |
| 5,618,318 A | 4/1997 | Rodriquez et al. | |
| 6,013,293 A | 1/2000 | De Moor | |
| 2002/0127305 A1* | 9/2002 | Clarke | 426/106 |

OTHER PUBLICATIONS

Carbon dioxide, Dec. 7, 2002.*
Oyxgen, Dec. 9, 2000.*
U.S. Appl. No. 11/758,837, filed Jun. 6, 2007, Forysth et al.

* cited by examiner

*Primary Examiner* — Rena Dye
*Assistant Examiner* — Preston Smith
(74) *Attorney, Agent, or Firm* — Frost Brown Todd LLC

(57) ABSTRACT

A method for storing respiring produce, particularly bananas, during ripening is disclosed. The method allows bananas to remain in the ripened condition for an extended period of time while, at the same time, having improved sweetness and taste characteristics. In this method, during ripening, the produce is maintained in a gas medium which comprises oxygen and carbon dioxide and has the following characteristics:
PR=ratio of oxygen to carbon dioxide=(20.94−B)/C=from about 1.8 to about 3.8; wherein B is the percentage (by weight) of oxygen in the gas medium and C is the percentage (by weight) of carbon dioxide is the gas medium, and the percentage (by weight) of oxygen (in the gas medium) is from about 1.0 to about 6.0, and the percentage (by weight) of carbon dioxide in the gas medium is from about 3.0 to about 10.0.

6 Claims, 1 Drawing Sheet

METHOD FOR STORING BANANAS DURING RIPENING

This application is based upon and claims priority from U.S. Provisional Application No. 60/805,931, filed Jun. 27, 2006, incorporated herein by reference.

FIELD OF INVENTION

The invention relates to the field of packaging and storing fruits and vegetables, in particular, bananas.

BACKGROUND OF THE INVENTION

During banana storage, starting at the moment of harvesting until delivery to the distribution network and directly to the consumer, it is necessary to pack bananas for different modes of storage, at various points in the process.

Bananas are usually harvested when they are unripe (green), and stored at a temperature of between 56° F. and 59° F. They can be stored in such a way for a sufficiently long time.

To activate the banana ripening process, the temperature is usually increased to between 60° F. and 62° F. and/or the composition of the gas medium surrounding the bananas is changed by adding ethylene to it. Ethylene, combined with an increased temperature, contributes to the beginning of the banana ripening process.

However, for the bananas to not ripen too quickly, or not spoil, their ripening process is usually conducted at a lower temperature, and in a gas medium characterized by a specifically selected composition.

Different innovations are known from the Prior Art that relate to methods for bananas storage and packing.

In U.S. Pat. No. 5,556,658, "Method for packaging, storing and ventilating produce", Raudalus et al, issued Sep. 17, 1996, a container system is described that is intended for transportation and storage of bananas. The system includes the external tare, internal container and a flexible bag positioned inside the container, in which the bananas are placed. The container has holes for ventilation, while the flexible bag has means for opening and closing. Such a design provides for the required ventilation and temperature for banana storage. The ability to open the bag allows ethylene to be delivered inside the bag, which activates the banana ripening process.

In U.S. Pat. No. 6,617,711 "Method of producing a container of bananas and method of transferring bananas", Rodriguez et al, issued Apr. 8,1997, a method for manufacturing a container for transportation and storage of bananas is described. The method utilizes a flexible internal container that is inserted into the external tare prior to placing banana clusters into it. The banana clusters are placed in layers, with gaps between them created with filling gaskets. Such placement of bananas can provide for ventilation and an even temperature throughout the entire inner space of the container.

In U.S. Pat. No. 6,013,293, "Packaging respiring biological material with atmosphere control member", De Moor, issued Jan. 11, 2000, packaging is described which provides for a required gas composition during storage of fruits and vegetables and other respiring biological materials. Part of the packaging is made as a gas-permeable membrane, which has selective properties, ie, lower oxygen-permeability as compared to carbon dioxide. The membrane provides optimum conditions for storing bananas because oxygen is delivered into a package from the external environment, while carbon dioxide, which is released during the ripening process, is removed from the packaging.

However, known methods do not provide for a long-term process for storing bananas during ripening, nor do they improve the flavor characteristics at earlier ripening stages.

BRIEF DESCRIPTION OF THE INVENTION

A method of the present invention is as follows: The method requires that during ripening bananas are stored in a gas medium that comprises oxygen and carbon dioxide; the remaining part is other gases, predominantly nitrogen. In this gas medium, during storage, the ratio of oxygen to carbon dioxide meets the following conditions:

$PR=(20.94-B)/C=$about 1.8 to about 3.8; preferably from about 2 to about 3.4;

where B=percentage of oxygen (by weight) in the composition of the gas medium, and C=percentage of carbon dioxide (by weight) in the composition of the gas medium.

In these cases, the indicated percentages of oxygen and carbon dioxide in the gas medium are selected from the following values: Oxygen % (by weight) from about 1.0 to about 6.0; and carbon dioxide % (by weight): from about 3.0 to about 10.0.

These conditions are maintained in the package once ripening has commenced and over the period of storage.

This method allows for a longer period of storage during banana ripening and results in improved flavor characteristics at earlier stages of ripening, when the greater part of starch is modified into sugars. The use of this method can deliver bananas to the consumer that are capable of retaining their preferred eating characteristics for longer periods of time than bananas ripened using other ripening methods.

For example, in the present invention, a gas medium of indicated composition can be fed into the volume where the bananas are stored.

In another case, the gas medium could be maintained using a gas-permeable membrane that separates the storage volume from the external atmosphere. Selective exchange occurs between the gas medium inside the packaging and the atmospheric air, through a selective gas-permeable membrane. The membrane assures that the gas medium inside the package retains the defined and required composition.

The area of the selective gas-permeable membrane is chosen based on the relationship between the area of the membrane and the area of gas-impermeable part of the package; that ratio is preferably within the range of from about $5*10^{-4}$ to about $5*10^{-2}$ (for example, from about $5*10^{-4}$ to about $2*10^{-3}$).

DETAILED DESCRIPTION OF THE INVENTION

Figure 1:
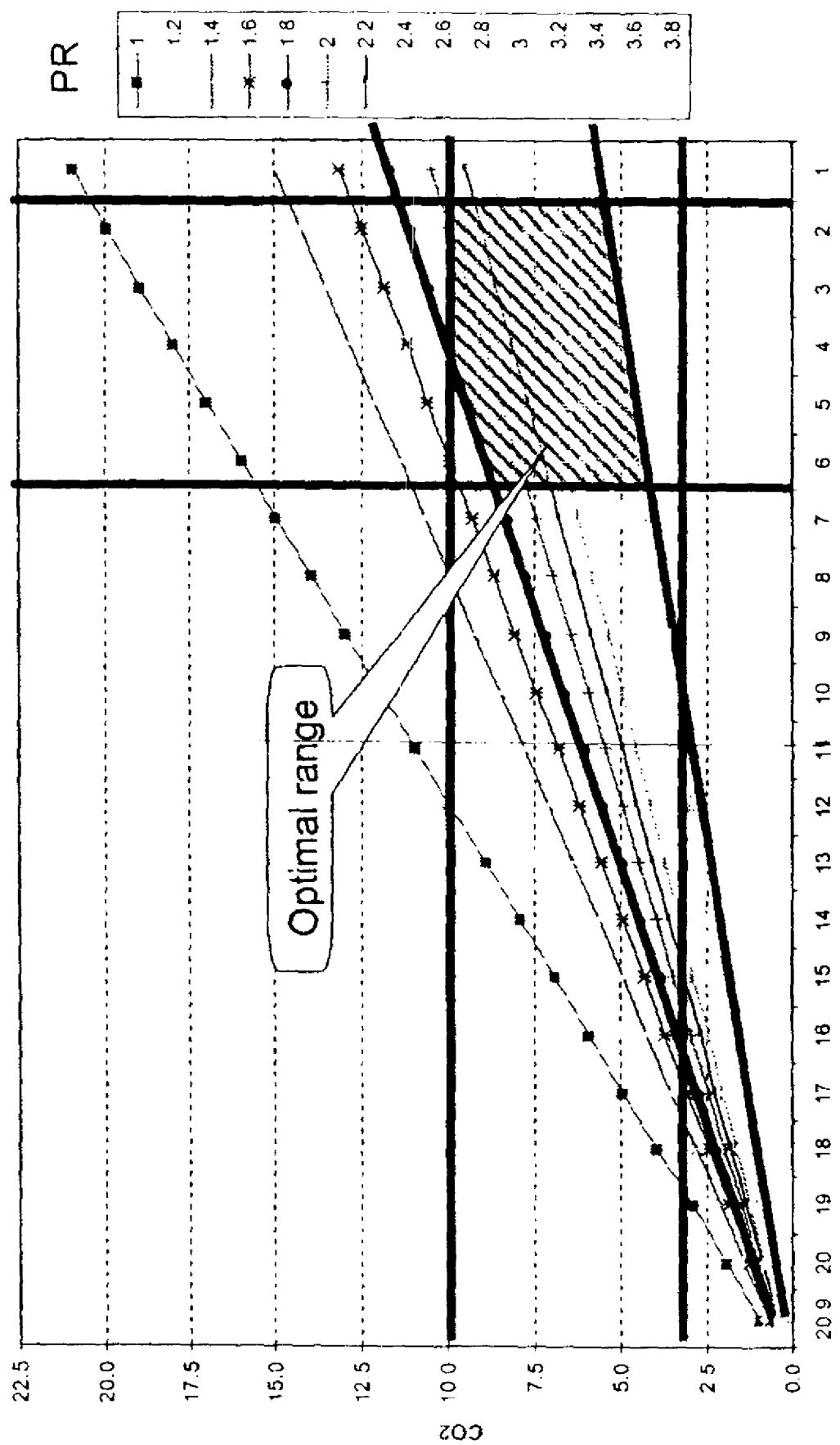
FIG. 1 is a plot of carbon dioxide vs. oxygen content in a package of bananas demonstrating the optimum ripening characteristics described herein.

The method for storing bananas during the ripening can be implemented in the following way.

Bananas are placed inside a package that allows for a gas exchange between the gas mixture inside the package and the external atmosphere. The relationship between oxygen and carbon dioxide is maintained at the conditions defined below.

Green bananas, prior to the activation of their ripening, can be stored using any of the known methods, in collective containers or individual packages. The beginning of banana ripening can be activated using any of the known methods, for example, by increasing the temperature, injecting ethylene into the gas volume that surrounds the bananas, or via a combination of these methods.

The method herein claimed is implemented during the ripening process (eg. after activation of the ripening).

The specified gas medium in which bananas should be stored can be generated in 1) large containers where the bananas are placed, or 2) in individual packages (for example for one or several bananas).

In the first case, the composition of the gas medium can be maintained, for example, by delivering the required amount of the specified gas into a container, based on information provided by sensors installed inside the container, or by using an adequately sized internal or external gas permeable selective membrane.

The relationship of percentage of oxygen to the percentage of carbon dioxide in the gas medium inside the container, should meet two conditions:

$PR=(20.94-B)/C$, where PR is within the range of from about 1.8 to about 3.8, preferably from about 2 to about 3.4. In this case, the content of oxygen and carbon dioxide individually in the gas medium should stay within the following ranges:

Oxygen, % (by weight): from about 1.0 to about 6.0; and Carbon dioxide, % (by weight): from about 3.0 to about 10.0.

In the second case, generally used in packages containing a small number of bananas (eg, from about 0.1 to about 40 pounds), it possible to use selective gas-permeable membranes or perforated films to maintain the necessary gas composition, or other suitable methods. The indicated membranes or films occupy part of the area of the package, and are characterized by different permeability for oxygen and carbon dioxide. Those parameters of the membrane's permeability should maintain the indicated percentage of oxygen and carbon dioxide inside the package.

The function of such selective membranes or perforated films can be performed by membranes and films similar to those on the market used in packaging for fruit storage. However, the chosen membranes should possess properties that would provide the necessary (in keeping with the claimed method) composition of gas atmosphere inside the packages. Examples of such membranes are taught in U.S. Pat. No. 6,013,293, De Moor, issue Jan. 11, 2000, incorporated herein by reference.

The outlined method would allow bananas that have achieved a color grade of 5 to be stored for 7 days or longer. That is twice as long as what can be achieved with conventional packaging (extended shelf life). The total shelf life of a banana, using the present invention, after starting the ripening process, can be as long as 16-17 days compared with 8 days in conventional packaging. Also, improved flavor characteristics (sweeter taste) are achieved at earlier stages of ripening using the present invention. Bananas of color grade 5 have the taste of those of color grade 6. Also, after being removed from the package, ripe bananas maintain their color grade for 2-3 days.

Bananas stored using the outlined method are also more resistant to changes in external conditions (such as temperature changes).

The method defined herein can be used for the storage of any ripening fruit or vegetables (eg, bananas, avocados). It is particularly useful with regard to bananas.

An experiment is performed under the following conditions to demonstrate the present invention and its benefits.

One batch of bananas (22 units), with a total weight of 10 pounds after ripening is kept in packaging with a gas-permeable membrane. The packaging provides for an internal gas composition with a ratio of oxygen percentage to carbon dioxide percentage as PR=2.5. A built-in "Landec" membrane (U.S. Pat. No. 6,013,293), with an operational area of 2.5 in$^2$, is used in the package which otherwise is not gas permeable.

A control batch of bananas, with the same quantity and total weight, is preserved in an ordinary hermetically sealed package.

The temperature of bananas during the experiment is 60° F., the degree of ripeness for the bananas is 2.5 at the beginning of experiment, 4.5-5 at the end.

Sugar content of the bananas is measured during the experiment and the presence of sucrose, fructose, and glucose in the bananas is identified.

When a ripeness degree of 4.5-5 is attained, the sugar content of the stored bananas is measured. The measurement results appear in Table 1.

TABLE 1

| | Sugar Content | | | |
| --- | --- | --- | --- | --- |
| | Sucrose % | Fructose % | Glucose % | Total % |
| Storage in an ordinary package | 6 | 2.2 | 2.2 | 10.4 |
| Storage in a package that maintains the ratio of oxygen to carbon dioxide as PR = 2.5 | 3.4 | 3.8 | 4.4 | 11.6 |

The storage of bananas is accompanied by a transition (transformation) of fructose and glucose into sucrose.

Total sugar content during storage of bananas in the package where the PR is maintained as 2.5 appears to be higher (11.6%) than during storage in an ordinary package (10.4%).

Also, during the storage of bananas in the package where the PR is maintained at 2.5, the content of fructose and glucose appears to be significantly higher. This gives better flavor properties for the bananas in terms of sweetness.

Bananas in that package also exhibit a significantly less intense transition to sucrose. Ripening of the banana pulp occurs faster than ripening of the peel, which leads to attractive market conditions of bananas, as well as to a sweeter pulp. The described package approximately doubles the shelf life of bananas.

During storage in the described package, the banana will "live" for 3 days without any changes, if the package is opened on the ninth day of storage. If the package is opened on the twelfth day, the banana will "live" for 2 days; if the package is opened on the sixteenth day, the banana will "live" for 1 day.

When bananas are stored in an ordinary package, and that package is opened on the fifth day, the banana will "live" without any changes to the peel and pulp for 2 days, but when opened on the sixth day, it will "live" for only 1 day.

The experiments also show that, with the specified PR, the package increases the resistance to Chill Injury while storing bananas at temperatures within a range (±3-5° F.) of 54° F.

What is claimed is:

1. A method for extending the retail shelf life of individual packages of bananas, comprising, during ripening and retail shelf life of said product, maintaining said product in an individual package containing one banana, which package includes a gas medium comprising oxygen and carbon dioxide, wherein the ratio of oxygen to carbon dioxide in said gas medium meets the following conditions: $PR=(20.94-B)/$ C=from about 1.8 to about 3.8; wherein B is the percentage (by weight) of oxygen in the gas medium, and C is the percentage (by weight) of carbon dioxide in the gas medium; and further, wherein the percentage (by weight) of oxygen in the gas medium is from about 1.0 to about 6.0, and the percentage (by weight) of carbon dioxide in the gas medium is from about 3.0 to about 10.0, wherein the ripening is activated in said package by increasing the temperature of the bananas to 60° F.-62° F., adding ethylene to the gas medium surrounding the bananas, or combinations thereof, after which said package is sealed, and further wherein the composition of the gas medium is maintained by incorporating into the package, which has a non permeable portion, a selectively gas permeable membrane wherein the ratio of the area of the selectively gas-permeable membrane to the area of the non-gas-permeable portions of the package is from about $5\times10^{-4}$ to about $5\times10^{-2}$.

2. The method according to claim 1 wherein the bananas are maintained in the defined gas compositions during their entire period of shipping, storage and retail shelf life.

3. The method according to claim 1 which allows bananas which have achieved a color grade of 5 to be stored for at least 7 more days without becoming over-ripe.

4. The method according to claim 1 wherein PR is from about 2 to about 3.4.

5. The method according to claim 1 wherein said package is sealed when the banana reaches a color grade of about 2.5.

6. The method according to claim 1 further comprising the additional step: placing the individual package containing the one banana on retail sale.

* * * * *